United States Patent [19]

Imai et al.

[11] 4,341,838

[45] Jul. 27, 1982

[54] MOLDING COMPOSITIONS AND DIAPHRAGMS, ARM PIPES AND HEAD SHELLS MOLDED THEREFROM

[75] Inventors: Kunio Imai, Tokorozawa; Tsunehiro Tsukagoshi, Tokyo; Shinichi Yokozeki, Tokyo; Toshikazu Yoshino, Tokyo; Yasuyuki Arai, Tokyo, all of Japan

[73] Assignee: Pioneer Electronic Corporation, Tokyo, Japan

[21] Appl. No.: 132,980

[22] Filed: Mar. 24, 1980

[30] Foreign Application Priority Data

Mar. 23, 1979 [JP] Japan ................................ 54/033263
May 25, 1979 [JP] Japan ................................ 54/063957

[51] Int. Cl.$^3$ ............................................ B32B 27/30

[52] U.S. Cl. .................................... 428/338; 428/402; 428/408; 523/220; 524/525; 524/567

[58] Field of Search ......................... 260/42.49, 42.32; 423/445; 274/23 R; 181/167; 428/402, 522, 338

[56] References Cited

U.S. PATENT DOCUMENTS 3,399,103 8/1968 Salyer et al. ..................... 260/42.49
3,399,104 8/1968 Ball et al. ......................... 260/42.49
3,775,359 11/1973 Georgiana et al. ............. 260/42.49
3,918,722 11/1975 Nakajima et al. ................ 274/23 R
4,221,773 9/1980 Tsukagoshi et al. ................ 423/445
4,228,050 10/1980 Martin et al. .................. 260/23 XA

FOREIGN PATENT DOCUMENTS 54-87209 7/1979 Japan .

*Primary Examiner*—Lewis T. Jacobs
*Attorney, Agent, or Firm*—Armstrong, Nikaido, Marmelstein & Kubovcik

[57] ABSTRACT

A molding composition comprising a thermoplastic resin in admixture with flaky graphite and carbon black is molded into an acoustic article which shows a high specific modulus of elasticity due to graphite and an increased internal loss due to carbon black. Preferred molding compositions contain 10–90 wt % of polyvinyl chloride or a vinyl chloride-vinyl acetate copolymer and 90–10 wt % of graphite flakes plus carbon black submicron particles. Carbon black is present in an amount of 0.1–2 parts per part of flaky graphite. Speaker diaphragms, arm pipes and head shells are fabricated from the molding composition. The composition is kneaded and rolled to orient the graphite flakes, and subsequently molded into an article, which is then optionally carbonized or graphitized.

31 Claims, 9 Drawing Figures

MOLDING COMPOSITIONS AND DIAPHRAGMS, ARM PIPES AND HEAD SHELLS MOLDED THEREFROM

BACKGROUND OF THE INVENTION

This invention relates to molding compositions and articles made therefrom. More particularly, this invention relates to molding compositions for fabricating acoustic articles comprising graphite powder and a polymer, and acoustic diaphragms, arm pipes and head shells made therefrom.

For the fabrication of elements used in acoustic instruments such as diaphragms in speakers and arm pipes and head shells in record players, light weight materials are required having a high modulus of elasticity. Typical of such materials are metals such as aluminum, titanium and beryllium, and composite materials such as CFRP (carbon fiber reinforced plastics) and graphite in synthetic resins.

Since metallic materials are poor in internal loss, speaker diaphragms made therefrom have shortcomings that sound pressure is remarkably increased around resonance frequencies in the high region of a reproduction frequency range and the damping characteristics are poor. On the other hand, paper, synthetic resins and their composite materials are known as having sufficient internal loss. These materials, however, have an insufficient modulus of elasticity for speaker diaphragms made therefrom to reproduce high frequency sound and hence, to provide a wide frequency range.

Similar discussion is made on elements used in a tonearm system. It is desired to reduce the mass of a vibration system to improve the compliance of a cartridge. Further, the increased internal loss of the system is desired to prevent partial vibration. A reduction of the mass of a vibration system can be achieved by providing a light-weight arm pipe and head shell. When the wall thickness of such an element is thin for the purpose of light weight, undesired partial vibration tends to occur, which adversely affects sound quality. For this reason, light weight materials having high stiffness and hence, a sufficient specific modulus of elasticity as well as an increased internal loss are desired for the fabrication of arm pipes and head shells.

Metallic arm pipes and head shells have a high specific modulus of elasticity, but have a poor internal loss. Carbon fiber itself has a high specific modulus of elasticity and a relatively high internal loss. However, carbon fiber must be bound by a synthetic resin into a composite material in order to fabricate a shaped article. The addition of a synthetic resin reduces the specific modulus of a composite material.

The inventors previously proposed diaphragms, arm pipes and head shells made from a kneaded mixture of flaky graphite and a high molecular compound. Articles molded from such compositions, surface oxidized articles and carbonized articles are disclosed in U.S. Ser Nos. 968,912 (filed Dec. 13, 1978) U.S. Pat. No. 4,221,773, issued Sept. 9, 1980, 53,425 (filed June 29, 1979) now abandoned, 63,531 (filed Aug. 3, 1979) U.S. Pat. No. 4,261,580, issued Apr. 14, 1981, 63,532 (filed Aug. 3, 1979) U.S. Pat. No. 4,269,416, issued May 26, 1981, and 78,045 (filed Sept. 24, 1979). These materials are relatively light weight and have a high modulus of elasticity and a high internal loss. Diaphragms, arm pipes and head shells made therefrom show good properties for their purposes.

SUMMARY OF THE INVENTION

An object of this invention is to improve the previously proposed materials and to provide a molding composition which has further improved modulus of elasticity and internal loss when molded into acoustic articles such as diaphgrams, arm pipes, head shells, cartridge bodies, speaker cabinets, speaker horns, and turn table housings.

Another object of this invention is to provide diaphragms, arm pipes and head shells molded from the above composition.

The inventors have found that molding compositions comprising flaky graphite and a high molecular compound can be further improved by adding carbon black thereto. The resulting compositions have improved modulus of elasticity due to graphite powder and improved internal loss due to carbon black.

According to one aspect of the present invention, there is provided a molding composition which comprises a high-molecular compound, preferably a thermoplastic resin in admixture with graphite powder and carbon black. The molding composition may further includes a rubber-like material in addition to the thermoplastic resin. The composition may be prepared by blending and kneading the components.

According to another aspect of the present invention, there is provided a diaphragm for use in acoustic instruments, particularly speakers which comprises a shaped body of the above-defined molding composition.

According to a third aspect of the present invention, there is provided an arm pipe comprising a shaped body of the above-defined molding composition.

According to a fourth aspect of the present invention, there is provided a head shell comprising a shaped body of the above-defined molding composition.

In the shaped body which may take the form of a diaphragm, arm pipe or head shell, it is preferred that graphite flakes are oriented in parallel with the surface of the body. The shaped body may be oxidized at the surface thereof. Further, the shaped body may be carbonized or graphitized.

In a preferred embodiment of the present invention, an article for use in acoustic instruments is produced by kneading a high-molecular compound with graphite powder and carbon black, rolling the kneaded mixture into a sheet, and then molding the sheet into an article. When the article is a diaphragm of cone or dome type or a head shell, the sheet may be molded in a usual manner, as by vacuum forming, air-pressure forming and press molding. When the article is an arm pipe, the sheet may be rounded into a cylinder. In either case, the molded article may be further subjected to carbonization or graphitization.

Examples of the high molecular compounds which can be used in the molding compositions according to the present invention are thermoplastic resins including homopolymers and copolymers such as polyvinyl chloride, polyvinylidene chloride, a vinyl chloride-vinyl acetate copolymer, a vinyl chloride-acrylonitrile copolymer, and a vinylidene chloride-acrylonitrile copolymer, and mixtures thereof. Also included are blends of such homopolymers or copolymers with a rubber-like material such as an acrylontrile-butadiene rubber. Among these, most preferred are polyvinyl chloride and a vinyl chloride-vinyl acetate copolymer and blends of them with an acrylonitrile-butadiene rubber.

Graphite powder is of flake type having the shape of a disc with a relatively large diameter and a small thickness. Preferably, graphite flakes have an average grain size of about 20 microns or less, most preferably of about 5 microns or less.

Carbon black may be selected from furnace black, channel black and like. Generally, carbon black is of submicron particles. The preferred carbon black has a grain size of 0.01–0.5 microns.

According to the present invention, 10–90% by weight of the resinous component including the thermoplastic resin and optional rubber-like material is mixed with 90–10% by weight of the carbon component including graphite and carbon black. Preferably, 30–70 wt% of the resinous component is mixed with 70–30 wt% of the carbon component. Carbon black is used in amounts of 0.1–2 parts by weight per part of graphite. Best results are obtained when carbon black and graphite are used in substantially equal amounts.

BRIEF DESCRIPTION OF THE DRAWINGS

The invention will now be described by referring to the accompanying drawings in which.

DESCRIPTION OF THE PREFERRED EMBODIMENTS

Figure 1:
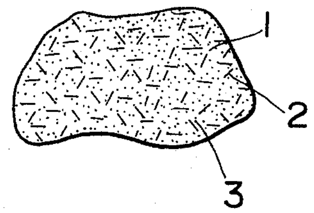
FIG. 1 is a cross-sectional view of a mass of a high molecular compound in admixture with graphite and carbon black according to this invention.

The molding composition according to the present invention may be prepared by adding amounts of graphite powder and carbon black to a high molecular compound. A suitable plasticizer and/or stabilizer may be optionally added to the mixture. The mixture is kneaded by means of a kneader or roll while it is heated at the softening temperature of the high molecular compound, generally at a temperature of 130°–200° C. As shown in FIG. 1, the resulting mass contains graphite flakes 2 and carbon black 2 in a resinous matrix 1 in a random fashion. Head shells, pickup cartridge bodies or the like may be directly fabricated from this kneaded mass by compression molding or pressure molding.

Figure 2:
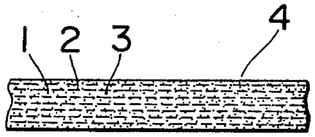
FIG 2 is a cross-sectional view of a sheet prepared by rolling the mass shown in FIG. 1.

The kneaded mass is then rolled into a sheet 4 as shown in FIG. 2. Rolling causes the graphite flakes 2 to orient in parallel with the surface of the sheet 4, therey increasing the modulus of elasticity and stiffness of the sheet. This sheet is a starting material from which a diaphragm, head shell, arm pipe, speaker cabinet, speaker horn or turntable housing may be fabricated by vacuum forming, pressure forming or press molding.

Figure 3:
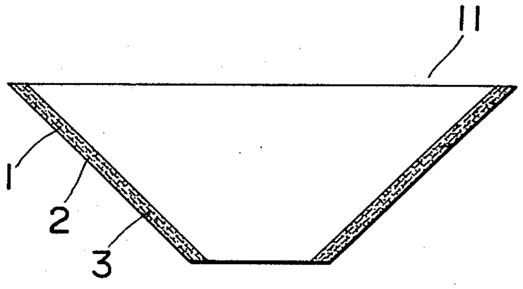
FIG. 3 is a cross-sectional view of a diaphragm molded from the sheet shown in FIG. 2 according to this invention.

A diaphragm 11 as shown in FIG. 3 may be obtained from the sheet 4 by any suitable molding process, for example, by vacuum forming, pressure forming and press molding. In FIG. 3, the diaphragm 11 is shown as having a cone shape. The sheet may also be molded into a dome-shaped diaphragm. Molding is preferably effected at a temperature of 70°–150° C. or near the softening point of the resin.

Figure 4:
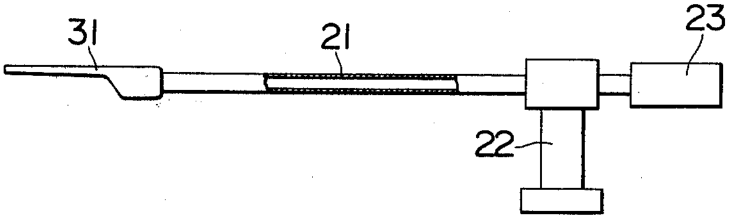
FIG. 4 is a schematic view of a tone arm system.

FIG. 4 is a schematic view of a tonearm system. An arm pipe 21 is pivoted by a fulcrum 22 and has at the rear end a counterweight 23 movably mounted and at the front end a head shell 31 fixedly mounted thereon.

Figure 5:
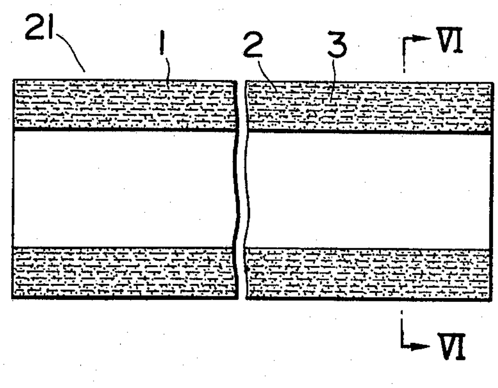
FIG. 5 is an axial cross-section of an arm pipe according to this invention.
Figure 6:
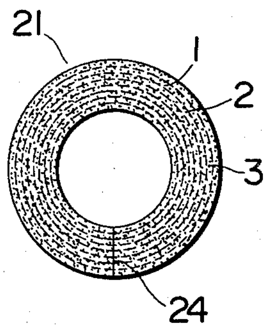
FIG. 6 is a cross-section of the arm pipe taken along line VI—VI in FIG. 5.

The arm pipe 21 is prepared from the above rolled sheet 4. As shown in FIGS. 5 and 6, the sheet is formed into a hollow cylinder and the side edges are bonded to each other at an interface 24 by heat bonding or with an adhesive. Graphite flakes 2 are oriented axially or in parallel with the surface of the resultant arm pipe 21. Graphite flakes 2 and carbon black submicron particles 3 are uniformly distributed throughout the resinous matrix 1.

Figure 7:
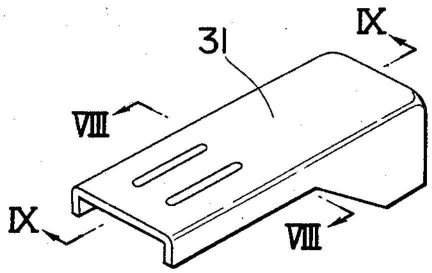
FIG. 7 is a perspective view of a head shell.
Figure 8:
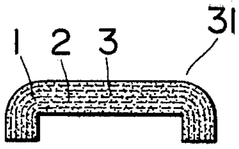
FIGS. 8 and 9 are cross-sectional views of the head shell taken along lines VIII—VIII and IX—IX in FIG. 7, respectively.
Figure 9:
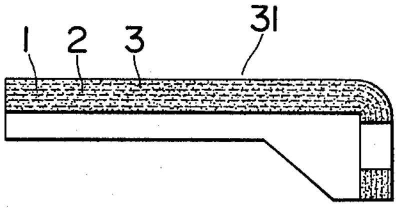

The head shell 31 is also fabricated from the above rolled sheet 4 by any suitable molding process, for example, by vacuum forming, pressure forming and press molding. FIGS. 7, 8 and 9 show that graphite flakes 2 are oriented in parallel with the surface of the resultant head shell 31. Uniform distribution of graphite flakes 2 and carbon black submicron particles 3 in the resinous matrix 1 is also depicted. Alternatively, the head shell 31 may be fabricated from the kneaded mass. In the alternative case, graphite falkes and carbon black particles are uniformly distributed in the resinous matrix, but the graphite flakes are not oriented.

The diaphragm 11, arm pipe 21, and head shell 31 may be subjected to carbonization or graphitization to increase their stiffness.

For example, the diaphragm is placed in a matching support to prevent the diaphragm from being deformed in the subsequent heat treatment. The diaphragm held by the support is then gradually heated in an oxidizing atmosphere, for example, in air to a temperature of 250°–350° C. at a rate of 1°–10° C./hour to effect pre-sintering. The diaphragm is oxidized at its surface and rendered infusible during this pre-sintering. The infusible diaphragm may be carbonized by heating it in a non-oxidizing atmosphere or in vacuum to a temperature of 1000°–1500° C. at a rate of 10°–20° C./hour. Graphitization may be achieved by heating the infusible diaphragm to a temperature of 2000°–3000° C. under similar conditions as used in the carbonization treatment. It will be understood that the arm pipe and head shell may be carbonized or graphitized in the same manner as the diaphragm. Carbonization and graphitization serve to increase the modulus of elasticity of a shaped article.

The following examples are illustrative of the present invention, but not construed as limiting the invention thereto.

EXAMPLE 1

A molding composition was prepared by kneading the following ingredients between rolls at a temperature of about 150° C.

| Ingredient | Parts by weight |
|---|---|
| 90/10 vinyl chloride-vinyl acetate copolymer | 100 |
| Lead stearate (stabilizer) | 2 |
| BPBG (plasticizer) | 10 |

-continued

| Ingredient | Parts by weight |
|---|---|
| Flaky graphite | 130 |
| Carbon black | 70 |

The kneaded mixture was rolled into a sheet having a thickness of 100 microns.

The sheet was then vacuum formed into a cone shape, obtaining a diaphragm sample.

EXAMPLE 2

| Ingredient | Parts by weight |
|---|---|
| 90/10 vinyl chloride-vinyl acetate copolymer | 100 |
| Lead stearate | 2 |
| BPBG | 10 |
| Flaky graphite | 180 |
| Carbon black | 20 |

The above ingredients were kneaded, rolled and molded into a sample as described in Example 1.

EXAMPLE 3

| Ingredient | Parts by weight |
|---|---|
| Polyvinyl chloride | 30 |
| Acrylonitrile-butadiene rubber | 70 |
| Lead stearate | 0.3 |
| BPBG | 3 |
| Flaky graphite | 100 |
| Carbon black | 100 |

The above ingredients were kneaded, rolled and molded into a sample as described in Example 1.

EXAMPLE 4

The sample molded in accordance with Example 1 was further subjected to carbonization by holding it in a support and gradually heating in an oxidizing atmosphere to a temperature of about 300° C. at a rate of 1°-10° C./hour to effect pre-sintering or render the sample infusible. Then the resulting infusible sample was sintered by heating it in a non-oxidizing atmosphere to a temperature of 1200° C. at a faster rate of 10°-20° C./hour.

EXAMPLE 5

The sample molded in accordance with Example 1 was further subjected to graphitization. To this end, the sample was pre-sintered as described in Example 4. Then the infusible sample was sintered by heating it in a non-oxidizing atmosphere to a temperature of about 2500° C.

The densities of samples prepared in Examples 1-5 were determined. The samples in Examples 1-5 were also tested for Young's modulus and internal loss.

EXAMPLES 6A, 6B AND 6C (COMPARATIVE EXAMPLES)

A vinyl chloride-vinyl acetate copolymer and graphite powder were blended and kneaded at a weight ratio of 1:2. The resulting intimate mixture was rolled into a sheet in which graphite flakes were oriented in parallel with the surface. The sheet was molded into an article. Measurement was made after molding (6A), oxidation (6B), and carbonization (6C).

The results are shown in the following Table together with properties of conventionally used materials.

TABLE

| | Density $\rho$ kg/m$^3$ | Young's Modulus, E $\times 10^{10}$N/m$^2$ | Specific Modulus of elasticity, $\sqrt{E/\rho}$ $\times 10^3$ m/sec | Internal loss tan $\delta$ |
|---|---|---|---|---|
| Example 1 | 1750 | 4.0 | 4.8 | 0.10 |
| Example 2 | 1800 | 6.0 | 5.8 | 0.05 |
| Example 3 | 1500 | 2.0 | 3.6 | 0.25 |
| Example 4 | 1700 | 8.0 | 6.8 | 0.05 |
| Example 5 | 1700 | 12.0 | 8.3 | 0.03 |
| Example 6A | 1800 | 5.9 | 5.7 | 0.05 |
| Example 6B | 1800 | 8.8 | 7 | 0.02 |
| Example 6C | 1800 | 15.7 | 9.3 | 0.015 |
| Beryllium | 1800 | 23.0 | 11.3 | 0.005 |
| Titanium | 4390 | 11.9 | 5.2 | 0.003 |
| Aluminum | 2690 | 7.1 | 5.1 | 0.003 |
| Kraft paper | 570 | 0.2 | 1.9 | 0.10 |

As apparent from the Table, samples molded from molding compositions according to the present invention have light weight and a high modulus of elasticity due to the addition of graphite powder and a high internal loss due to the addition of carbon black. The specific moduli of samples according to Examples 1 and 2 are comparable to those of titanium and aluminum while their internal losses are higher by about 10 or more times than those of titanium and aluminum and substantially comparable to that of paper. Example 4 shows that carbonization doubles the modulus of elasticity of a sample, and Example 5 shows that graphitization triples the modulus of elasticity of a sample although the internal loss is somewhat reduced. Example 3 shows that a sample molded from a molding composition containing a rubber-like material in addition to a thermoplastic resin, exhibits a reduced modulus of elasticity and hence, a reduced specific modulus which is lower than those of metals, but higher than that of paper while its internal loss is high enough to compensate for a reduction of specific modulus. This means that a diaphragm molded from a composition of Example 3 can reproduce up to a higher frequency region as compared with conventional paper diaphragms.

A comparison of Example 1 with Example 6A reveals that the internal loss is improved by adding carbon black to a mixture of a thermoplastic resin and graphite. A comparison of Example 4 with Example 6C reveals that the internal loss is remarkably increased by the addition of carbon black even after the carbonization treatment.

Although samples molded in the above Examples are diaphragms, it will be understood that arm pipes and head shells may also be molded in a similar manner with similar results.

As described above, the molding compositions according to the present invention are light weight and have a high stiffness, a high specific modulus of elasticity and an increased internal loss when molded into an article. The essential components of the molding composition are high molecular compounds, graphite powder and carbon black which are all commercially available and inexpensive. The molding composition may be easily molded into an article using any suitable well-known molding technique. The properties of the composition may be controlled by selecting the blending ratio and the type of the components. Accordingly, high-performance acoustic articles such as diaphragms, arm pipes and head shells are available at low cost.

What is claimed is:

1. A diaphragm for use in acoustic instruments comprising a shaped body of 10–90% by weight of a thermoplastic resin in a kneaded admixture with 90–10% by weight of a combination of flaky graphite and carbon black, the weight ratio of carbon black to graphite flakes being 1:10 to 20:10, the graphite flakes being oriented in parallel with the surface of the body.

2. A diaphragm according to claim 1 wherein said thermoplastic resin comprises polyvinyl chloride.

3. A diaphragm according to claim 1 wherein said thermoplastic resin comprises a vinyl chloride-vinyl acetate copolymer.

4. A diaphragm according to claim 2 or 3 wherein said thermoplastic resin further includes a rubber-like material.

5. A diaphragm according to claim 4 wherein said rubber-like material is an acrylonitrile-butadiene rubber.

6. A diaphragm according to claim 1 wherein said shaped body is carbonized.

7. A diaphragm according to claim 1 wherein said shaped body is graphitized.

8. An arm pipe comprising a shaped body of 10–90% by weight of a thermoplastic resin in a kneaded admixture with 90–10% by weight of a combination of flaky graphite and carbon black, the weight ratio of carbon black to graphite being 1:10 to 20:10, the graphite flakes being oriented in parallel with the surface of the body.

9. An arm pipe according to claim 8 wherein said thermoplastic resin comprises polyvinyl chloride.

10. An arm pipe according to claim 8 wherein said thermoplastic resin comprises a vinyl chloride-vinyl acetate copolymer.

11. An arm pipe according to claim 9 or 10 wherein said thermoplastic resin further includes a rubber-like material.

12. An arm pipe according to claim 11 wherein said rubber-like material is an acrylonitrile-butadiene rubber.

13. An arm pipe according to claim 8 wherein said shaped body is carbonized.

14. An arm pipe according to claim 8 wherein said shaped body is graphitized.

15. A head shell comprising a shaped body of 10–90% by weight of a thermoplastic resin in a kneaded mixture with 90–10% by weight of a combination of flaky graphite and carbon black, the weight ratio of carbon black to graphite being 1:10 to 20:10, the graphite flakes being oriented parallel with the surface of the body.

16. A head shell comprising a shaped body of 10–90% by weight of a thermoplastic resin in a kneaded admixture with 90–10% by weight of a combination of flaky graphite and carbon black, the weight ratio of carbon black to graphite being 1:10 to 20:10, wherein the shaped body is carbonized.

17. A head shell comprising a shaped body of 10–90% by weight of a thermoplastic in a kneaded mixture with 90–10% by weight of a combination of flaky graphite and carbon black, the weight ratio of carbon black to graphite being 1:10 to 20:10, wherein the shaped body is graphitized.

18. A head shell according to claim 22, 16 or 17 wherein said thermoplastic resin comprises polyvinyl chloride.

19. A head shell according to claim 18 wherein said thermoplastic resin further includes a rubber-like material.

20. A head shell according to claim 19 wherein said rubber-like material is an acrylonitrile-butadiene rubber.

21. A head shell according to claim 15, 16 or 17 wherein said thermoplastic resin comprises a vinyl chloride-vinyl acetate copolymer.

22. A head shell according to claim 21, wherein said thermoplastic resin further includes a rubber-like material.

23. A head shell according to claim 22, wherein said rubber-like material is an acrylonitrile-butadiene rubber.

24. An acoustic structural body for use in audio equipment, which is fabricated from a molding composition comprising 10–90% by weight of a thermoplastic resin in a kneaded admixture with 90–10% by weight of a combination of flaky graphite and carbon black, the weight ratio of carbon black to graphite being 1:10 to 20:10, wherein the graphite flakes are oriented in parallel with the surface of the body.

25. An acoustic structural body according to claim 24 wherein said graphite has a grain size of not more than 20 microns and said carbon black has a grain size of not more than 1 micron.

26. An acoustic structural body according to claim 24 wherein said acoustic structural body is carbonized.

27. An acoustic structural body according to claim 24 wherein said acoustic structural body is graphitized.

28. An acoustic structural body according to claim 24 wherein said thermoplastic resin comprises polyvinyl chloride.

29. An acoustic structural body according to claim 24 wherein said thermoplastic resin comprises a vinyl chloride-vinyl acetate copolymer.

30. An acoustic structural body according to claim 28 or 29 wherein said thermoplastic resin further includes a rubber-like material.

31. An acoustic structural body according to claim 30 wherein said rubber-like material is an acrylonitrile-butadiene rubber.

* * * * *